Feb. 17, 1959     A. P. SORBER     2,873,509
METHOD OF MAKING A VARIABLE RESISTOR
Filed March 18, 1955     2 Sheets-Sheet 1
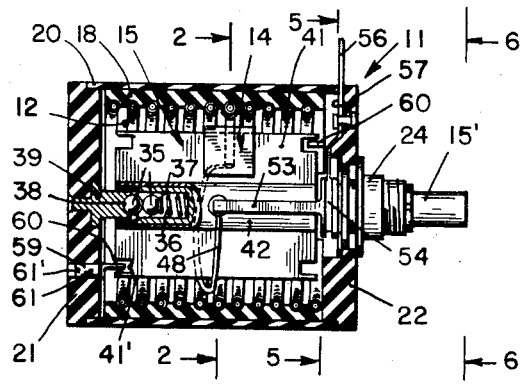
FIG. 1.
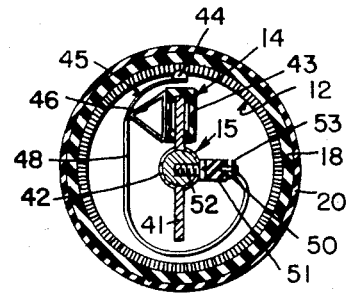
FIG. 2.
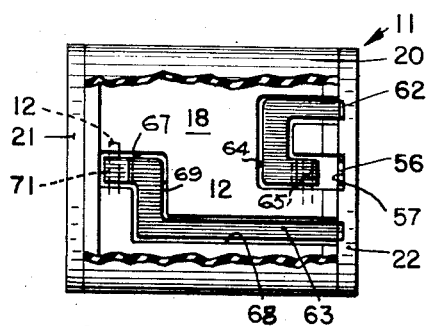
FIG. 3.
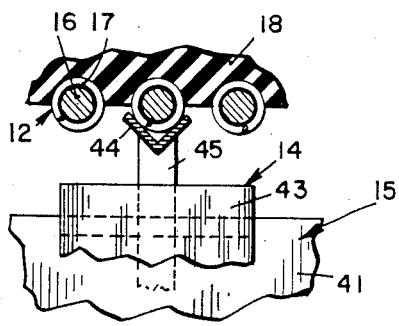
FIG. 4.
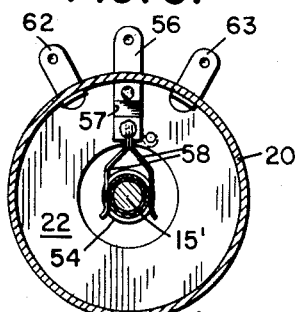
FIG. 5.
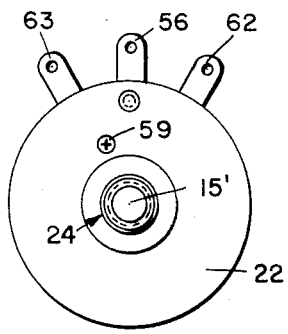
FIG. 6.
FIG. 7.
INVENTOR
ADELBERT PAUL SORBER, deceased,
By    GORDON PAUL SORBER, Administrator
BY
*Mason & Graham*
ATTORNEYS Feb. 17, 1959  A. P. SORBER  2,873,509
METHOD OF MAKING A VARIABLE RESISTOR
Filed March 18, 1955  2 Sheets-Sheet 2

INVENTOR
ADELBERT PAUL SORBER, deceased,
By GORDON PAUL SORBER, Administrator.
BY
Mason & Graham
ATTORNEYS United States Patent Office 2,873,509
Patented Feb. 17, 1959

2,873,509

METHOD OF MAKING A VARIABLE RESISTOR

Adelbert Paul Sorber, deceased, late of Los Angeles, Calif., by Gordon Paul Sorber, administrator, Los Angeles, Calif., assignor, by mesne assignments, to Librascope, Incorporated, a corporation of California Application March 18, 1955, Serial No. 495,226

3 Claims. (Cl. 29—155.5)

This invention relates to variable resistance units, particularly those having a helically disposed resistance element which is traversed by a wiper or contact member mounted rotatably relative to the resistance element.

Various types of variable resistors have been devised in which the resistance element extends helically, but one of the problems in the manufacture of such devices has been the great difficulty of making such units sufficiently accurate to obtain required electrical values within the close tolerances permitted by present-day electrical equipment in which such resistors are used.

An object of the present invention is to provide a novel, relatively simple method of making a variable resistor of the type indicated which makes it possible to produce an extremely accurate device. More particularly, it is an object to provide a method of making a resistor having a helically disposed resistance element which has a given resistance for a given number or fractional number of turns thereof.

A further object of the invention is to provide a method of making resistors of the type indicated which insures concentricity of the resistance unit and the sleeve in which it is mounted within the case of the device, which ordinarily supports the rotatable wiper mechanism.

A further object is to provide a new and improved variable resistance unit of extreme accuracy which has certain inherent advantages over previous devices.

Another object is to provide a novel, movable wiper or contact means, including a novel mounting for the contact element, which results in a device having low torque rotation of the control shaft.

Another object is to provide a unique construction for limiting rotation of the contact or wiper assembly.

Still another object is to provide a resistor unit of the type indicated having an improved terminal construction.

A further object is to provide a novel mounting for the rotor which carries the wiper assembly.

These and other objects will be apparent from the drawings and the following description.

Referring to the drawings:

Fig. 1 is a central sectional view longitudinally through a device embodying the invention;

Fig. 2 is a sectional view on line 2—2 of Fig. 1;

Fig. 3 is an elevational view of the case, partially broken away, to illustrate the end terminals;

Fig. 4 is a greatly enlarged fragmentary view of the wiper or contact element;

Fig. 5 is a sectional view on line 5—5 of Fig. 1;

Fig. 6 is an end view of the device;

Fig. 7 is a fragmentary enlarged sectional view of one end of the device;

Figure 8:
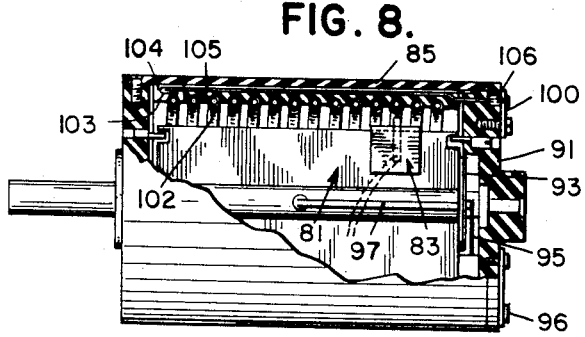
Fig. 8 is an elevational view of a modified form of the invention, broken away to show parts in section.
Figure 9:
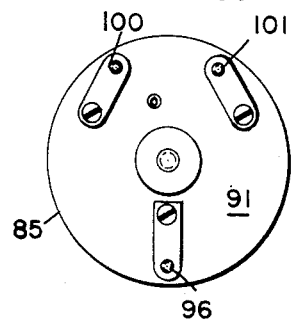
Fig. 9 is an end view of the device of Fig. 8.
Figure 10:
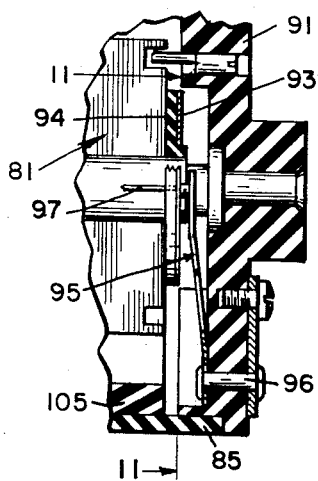
Fig. 10 is a fragmentary, enlarged sectional view of one end of the device of Fig. 8.
Figure 11:
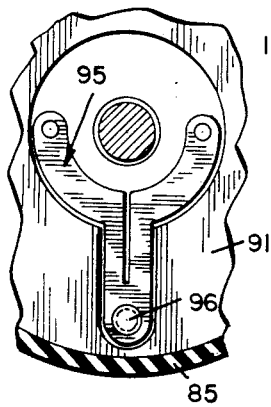
Fig. 11 is a sectional view on line 11—11 of Fig. 10.
Figure 12:
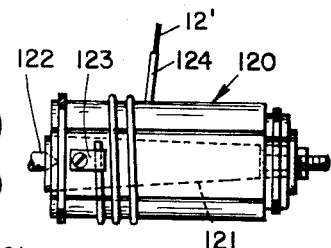
Fig. 12 is an elevational view of a mandrel showing the winding of the resistance element thereon.
Figure 13:
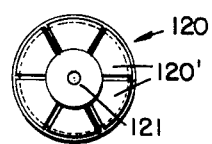
Fig. 13 is an end view of the apparatus of Fig. 12.
Figure 14:
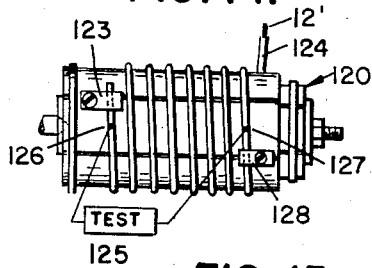
Fig. 14 is a view showing the testing of the resistance unit and the locating of terminal points thereon.

More particularly describing the invention, 11 indicates a resistance unit of the type embodying a helically disposed resistance element 12 which is engaged by a wiper or contact assembly 14 mounted on a rotor 15 which is turned by external means to vary the resistance characteristics of the electrical circuit in which the device may be connected.

The resistance element 12 may be of the type in which a central or core wire member 16 has a winding thereabout of fine resistance wire 17, the wires 16 and 17 being insulated with respect to each other by varnish, enamel or other conventional coating and the individual turns of wire 17 being spaced. Element 12 is mounted within a sleeve 18, shown as internally grooved, by means of a suitable cement or bonding material commonly used for this purpose. The sleeve 18 is mounted in an outer sleeve 20 which forms part of a case, end walls 21 and 22 completing the case and closing the ends of the sleeves. The sleeves 18 and 20 and end walls 21 and 22 are shown as formed of a material which is nonconductive electrically, such as a phenol formaldehyde resin product. This is not essential in that the case can be of metal so long as all electrical parts of the device are insulted therefrom.

The rotor is journaled within the case, having a shaft 15' which is supported at one end in a bearing assembly 24 consisting of an externally threaded tubular member 25 having a bearing race 26 adapted to oppose a race 27 on the rotor with ball bearings 28 therebetween. A split ring 29 in groove 30 in the shaft portion 15' serves to retain the parts. A flange 31 threads onto member 25 and bears against the wall 22 of the case.

The inner end of the rotor shaft is provided with one or more balls 35 which are urged outwardly by a spring 36, all contained in a bore 37. The outermost ball is received in a seat 38 provided by a metal insert member 39 in the end wall 21. The inner end of member 39 preferably freely extends into the end portion of bore 37 in the rotor shaft. With this construction, the shaft 15' is centrally journaled and rotates with very little friction, being biased axially slightly against the ball bearings 28.

Within the case the rotor is provided with a wing assembly which includes a pair of axially extending wings or flanges 41 projecting radially from a central tubular portion 42 which receives shaft 15'. This wing assembly could be made of insulative material, if desired. Upon one of these flanges there is slidably mounted the contact assembly 14 which includes a bifurcated slider block 43 of nonconductive material. This carries a metal contact element having a V-shaped head 44 of a size to straddle the resistance unit 12, contacting the same at two closely spaced points. This contact element thus acts both as an electrical contact or wiper and as a guide means for causing the contact assembly to follow the resistance unit 12 when the rotor is turned. The contact head is mounted at the end of a spring metal strip 45 forming part of a mounting bracket which further includes a triangular portion 46 secured to the slider block 43.

A wire 48 is soldered or otherwise attached at one end to the contact member and has its opposite end secured to a metal end portion 49 of a post 50 which has an intermediate portion 51 of insulation material and an inner, screw-threaded portion 52 which serves to secure the rotor wings to the rotor shaft. A conductor strip 53 connects electrically the end portion 49 of the post and hence wire 48 to a conductor ring 54 on the rotor adjacent the end wall 22 of the case. Ring 54 is insulated from the shaft by a suitable sleeve 55 of insulation material. An exterior terminal 56 is mounted in a recess 57 in the end wall 22 and this carries at its inner end a pair of wire brushes 58 which engage opposite sides of the conductor ring 54, the latter having a groove 54' therein to guide the wires.

It will be apparent that when rotor 15 is turned, slider block 43 moves longitudinally along the flange 41 as the contact head follows the turns of the resistance element 12, the latter acting as a cam member to move the entire contact assembly 14. I provide novel means for limiting travel of the contact assembly axially of the resistance element. This means comprises stop pins 59 mounted one in each end wall of the case which project axially inwardly of the case. These are preferably made adjustable by including an offset or eccentric inner end portion 60 projecting from the main portion 61, the latter being so mounted as to permit of its being rotatably adjusted by the application of a tool to a suitable slot or recess 61' in the outer end. The flanges 41 of the rotor are recessed at each end at 41' to clear the pins. As the slider block 43 approaches an end wall of the case, it reaches a position such that it projects outwardly beyond the inner end of the stop pin, abutting the same if the rotor is turned sufficiently, thereby preventing further rotation of the shaft in a direction which would further advance the contact assembly toward the end wall.

The device may be provided with as many terminals as desired for a particular application and, in the device illustrated, two terminals, 62 and 63, are shown in addition to the terminal 56. The terminals are connected respectively to the electrical ends or tapped portions of the resistance unit 12. By reference to Fig. 3 it will be apparent that the sleeve 18 is provided with a U-shaped recess 64 in its outer surface to receive the terminal, the latter being bent and formed appropriately to occupy the recess, and being welded or otherwise attached to the resistance unit 12 at 65. Since it is desirable to have the outer ends of all of the terminals at one end of the case, sleeve 18 is provided with a second terminal-receiving recess which includes a portion 67 at the opposite end of the sleeve from the region 65 where the terminal 62 connects with the resistance unit, and an axially disposed portion 68 which extends substantially the length of the sleeve at the opposite end thereof, the two portions being connected by a circumferential portion 69. The recess just described is occupied by the terminal member 63 which is attached to the resistance unit at 71.

In the operation of the device described, the resistance is varied by turning rotor 15 relative to the case. Such rotation moves the contact assembly 14 along the resistance unit as the contact head 44 engages a section of the resistance unit, acting both as an electrical contact and as a guide for moving the entire contact assembly axially of the helically coiled resistance unit in response to the turning action of the rotor.

In Figs. 8–11 I show a modified form of resistor having a rotor 81 carrying a wiper assembly 83. The rotor is supported within a case 85 in the same manner as rotor 15 previously described. In this form of the invention all of the terminals are mounted on end wall 91. A wiper contact ring 93 is supported on an insulating ring 94 at the inner end of the shaft. A bifurcated metal wiper spring 95 is mounted on end wall 91 by means of a rivet 96 which also serves to electrically connect the terminal and the spring. The ring 93 is connected to the wiper asembly by a metal strip 97.

In the form of the invention shown, two other terminals, 100 and 101, are provided and these are electrically connected to two desired points on the resistance element 102 by wires, one of which is shown at 103, a groove 104 being provided in the exterior of the sleeve member 105 to accommodate the wire 103. At one end the wires are attached to the resistance unit 102 and at the other end are received in rivet-like tubes 106 of the terminals wherein they may be soldered or otherwise secured.

While the devices I have shown and described may be made in various ways, one of the features of my invention is the provision of a novel method of making devices of this nature to achieve unusual accuracy and uniformity of product. This is accomplished in the following way: referring now to Figs. 12–16 of the drawings, I first wind the resistance element 12' about a radially expansible mandrel 120 with segments 120' which may be moved radially outwardly by adjustment of a tapered inner member 121 to increase the diameter of the mandrel. The mandrel can be mounted on a shaft 122 and suitable means provided for rotating this. The resistance element 12' is first secured by a clamp 123 adjacent one end of the mandrel and, in this connection, I prefer to simultaneously wind a flat strip 124 of metal between wire 12' and the mandrel, the strip being insulated from the wire by a suitable coating thereon. The metal strip serves to bridge any gaps between segments of the mandrel, insuring a more circular winding, and also serves to prevent any stretching of the resistance element when the mandrel is subsequently expanded, or displacement of the fine resistance wire.

Figure 16:
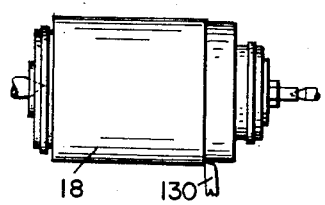
Fig. 16 illustrates the machining of the sleeve.
Figure 15:
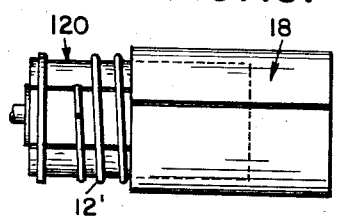
Fig. 15 illustrates the step of applying a sleeve to the resistance wire unit.

The resistance element is preferably wound upon the mandrel by rotating the mandrel and feeding the element thereto under tension until the desired number of turns are wound thereon. After this has been accomplished, a test unit 125 for measuring and indicating resistance values is electrically connected at the points 126 and 127, which are a desired number of turns or degrees apart. The length of the resistance element between these points is approximately known and the resistance value for this should be a given amount. However, I preferably so proportion the mandrel that the coil of resistance element wound thereon is slightly too small in diameter to give the required resistance value. With the test unit in place, the test contact 126 is maintained in engagement with the resistance element at the original point and the mandrel expanded, the contact point 127 being maintained stationary and the element being allowed to move therepast until the correct value is obtained. When this is accomplished the resistance element is secured by the clamp 128. With this procedure, two terminal points on the coil of resistance element are located which are a given number of degrees or turns apart and also a desired distance apart longitudinally of the resistance element with a given value for that distance. Subsequently the sleeve 18, which may be split axially at one side, is slightly expanded and placed over the wound resistance element, the sleeve having first been provided with an interior coating of suitable cement or the like. After the cement has set and the coil is firmly anchored within the sleeve, the outer surface of the sleeve is machined, as shown in Fig. 16 where 130 indicates a cutting tool, to provide the required diameter of the sleeve for fitting a given diameter of case. The machining step is optional and often may be omitted. The advantage of machining the sleeve lies in the fact that this adds greatly toward securing concentricity of the coiled resistance unit with the case.

After the sleeve has been machined, or if the machining is omitted, after it has been firmly cemented onto the resistance element, the assembly may be removed from the mandrel by contracting the mandrel and the terminals applied, after which the assembly can be cemented into the outer sleeve 20 of the case.

As an alternative to using a preformed sleeve 18, once the resistance element has been clamped in place after the terminal points have been located, I may cast a sleeve about the element. A machining step following this is optional, depending upon the accuracy of the casting.

While I have set forth above my preferred method of making the resistance unit which embodies the expansion of the coiled resistance element after the initial winding thereof, the method in its broader aspects includes adjusting the size of the coil to obtain the correct resistance value irrespective of whether the adjustment is by expanding or by contracting the coil. Thus, instead of initially winding the coil to have a diameter which is slightly less than required, I may originally wind the coil about a mandrel having too great a diameter and subsequently contract the mandrel and the coiled resistance element, drawing away the excess resistance wire at the unfastened end as the mandrel is contracted until the correct resistance value is obtained.

Although I have illustrated and described a preferred form of my invention, I contemplate that various changes and modifications can be made without departing from the invention, the scope of which is indicated by the following claims.

What is claimed is:

1. In a method of making a resistor having a helically coiled resistance element, the steps of winding the resistance element and a flat strip of non-conductive backing member for said resistance element in the form of a helix on a segmented expansible mandrel with said flat strip lying between said resistance element and said mandrel to bridge and support the resistance element at the gaps between the mandrel segments, anchoring the resistance element at one end thereof and maintaining the free end taut, electrically contacting said resistance element at the starting end adjacent the anchored point and at a second point adjacent the free end on the mandrel, measuring the resistance between said points with a resistance measuring instrument to determine the resistance value of the element for the full length thereof between said points of contact, uniformly and simultaneously adjusting the full length of said resistance element by adjusting said mandrel while maintaining fixed contact of said resistance measuring instrument with said starting end and maintaining sliding contact of said resistance measuring instrument with said resistance element at said free end until a required resistance value between said points is obtained, and subsequently anchoring said free end.

2. A method of making a resistor having an elongated helically coiled resistance element presenting an interior face adapted to be contacted by a slider movable along a helical path, including the steps of winding a resistance element into the form of a helix of uniform inside diameter, electrically contacting said element at points adjacent the opposite ends thereof with a resistance measuring instrument to determine the resistance value of the element between said points, adjusting the diameter of said helix equally along the entire length thereof to vary the amount of the resistance element disposed between said points while maintaining said helix of a uniform inside diameter, maintaining contact of said resistance measuring instrument with said resistance element during such adjustment until a given resistance value between said points is obtained, and anchoring said helix to retain the size and shape thereof.

3. The method of claim 2 wherein the diameter of the helix is adjusted by radially contracting the helix.

References Cited in the file of this patent

UNITED STATES PATENTS

| | | |
|---|---|---|
| 2,419,952 | Konicek et al. | May 6, 1947 |
| 2,454,986 | Beckman | Nov. 30, 1948 |
| 2,599,934 | Opocensky | June 10, 1952 |
| 2,623,145 | Upton | Dec. 23, 1952 |